(12) United States Patent
Maiden (10) Patent No.: US 8,362,432 B2
(45) Date of Patent: Jan. 29, 2013

(54) OPTICAL LIQUID SENSOR

(75) Inventor: Miles Maiden, Blue Hill, ME (US)

(73) Assignee: Hydro-Photon, Inc., Blue Hill, ME (US)

( * ) Notice: Subject to any disclaimer, the term of this patent is extended or adjusted under 35 U.S.C. 154(b) by 407 days.

(21) Appl. No.: 12/650,746

(22) Filed: Dec. 31, 2009

(65) Prior Publication Data
US 2010/0200756 A1 Aug. 12, 2010

Related U.S. Application Data

(60) Provisional application No. 61/150,487, filed on Feb. 6, 2009.

(51) Int. Cl.
*G01F 23/292* (2006.01)
(52) U.S. Cl. .................................................. 250/357.1
(58) Field of Classification Search ................ 250/357.1; 356/342
See application file for complete search history.

(56) References Cited

U.S. PATENT DOCUMENTS

| | | | |
|---|---|---|---|
| 2,834,235 A | 7/1955 | Sarti | |
| 3,665,201 A * | 5/1972 | Shea et al. | 250/574 |
| 4,039,845 A | 8/1977 | Oberhansli et al. | |
| 4,132,899 A | 1/1979 | Shigemasa et al. | |
| 4,320,394 A * | 3/1982 | John, Jr. | 340/618 |
| 4,880,990 A * | 11/1989 | Rando | 250/577 |
| 4,889,585 A | 12/1989 | Leyden et al. | |
| 4,906,845 A | 3/1990 | Bellhouse et al. | |
| 4,961,069 A | 10/1990 | Tsaprazis | |
| 5,029,471 A | 7/1991 | Goodrich | |
| 5,278,426 A | 1/1994 | Barbier | |
| 5,279,157 A | 1/1994 | Mattis et al. | |
| 5,534,708 A | 7/1996 | Ellinger et al. | |
| 6,448,573 B1 * | 9/2002 | Benton | 250/577 |
| 6,579,495 B1 * | 6/2003 | Maiden | 210/748.11 |
| 6,784,511 B1 * | 8/2004 | Kunihara et al. | 257/433 |
| 7,259,383 B2 | 8/2007 | Wirthlin | |
| 7,399,985 B2 * | 7/2008 | Mruk et al. | 250/577 |
| 2007/0053203 A1 * | 3/2007 | Graham | 362/559 |
| 2008/0290301 A1 * | 11/2008 | Gardner | 250/504 R |

FOREIGN PATENT DOCUMENTS

| | | |
|---|---|---|
| EP | 0007155 A1 | 1/1980 |
| EP | 0229960 A2 | 7/1987 |
| JP | 08 117742 A | 5/1996 |

OTHER PUBLICATIONS

International Search Report mailed May 12, 2010 for International Application No. PCT/US2010/000210 for Hydro-Photon, Inc. International Filing Date Jan. 27, 2010, 16 pages.

* cited by examiner

*Primary Examiner* — Constantine Hannaher
(74) *Attorney, Agent, or Firm* — Cesari and McKenna, LLP; Patricia A. Sheehan (57) ABSTRACT

The inventive optical sensor consists of an LED semiconductor material and elements (herein after the LED components) surrounded by a transparent encapsulant that allows much of the light produced by the LED components to pass while a certain small percentage of the light is internally reflected. The percentage of light internally reflected, depends upon whether at least a front face of the encapsulant is immersed in liquid or in air. The optical liquid sensor also consists of a strategically placed photo sensor that detects the intensity of light that is internally reflected by at least the front face of the encapsulant surrounding the LED. The photo sensor is able to detect the change in intensity of light being internally reflected by at least the front face of the encapsulated LED when the front face, for example, emerges from immersion in a liquid.

19 Claims, 6 Drawing Sheets

*Vdd MAY BE PULSED OR STEADY

FIG. 7

*Vdd IS PULSED

OPTICAL LIQUID SENSOR

CROSS-REFERENCE TO RELATED APPLICATIONS

This application claims the benefit of U.S. Provisional Patent Application Ser. No. 61/150,487, which was filed on Feb. 6, 2009, by Miles Maiden for an "Optical Liquid Sensor" and is hereby incorporated by reference.

BACKGROUND OF THE INVENTION

1. Field of the Invention

The invention relates to optical sensors and, more particularly, to an optical liquid sensor.

2. Background Information

Liquid sensing capability is important to the safe operation of portable UV water treatment devices. By sensing when the UV light source is and is not immersed in water, light source operation may be either enabled or disabled to ensure safety. Allowing a UV light source to turn on only when it is fully immersed in water protects the user against is potentially dangerous UV exposure.

In addition to UV light source control, there are many other applications in which liquid sensing is important. These include water and fuel level sensing in storage tanks, water level sensing in boat bilges and buildings (basements) for pump and alarm activation, water sensing in watertight compartments for alarm activation, and water sensing for automatically operating lifejackets, life raft or lifejacket emergency lighting, marine emergency radio beacon activation (EPIRB), etc.

Liquid sensing is often accomplished by measuring electrical conductivity using two electrodes, normally at a relatively low voltage. When the electrodes are held in air, they encounter an extremely high resistance and virtually no current flow occurs. When the electrodes are in liquid, they encounter a lower resistance than that of air and some small but measurable current begins to flow. By measuring this current or its associated voltage, control circuitry can determine the presence or absence of liquid and trigger actions such as enabling/disabling UV light source operation.

While conductivity sensing can be fairly reliable, it does have some weaknesses. For example, if the liquid in which the electrodes are immersed is of a very low conductivity, as in the cases of distilled water or snowmelt water, the current flow between immersed electrodes may be extremely low (in the nanoamp range) and difficult to use for reliable sensing. In response, the sensitivity of the liquid sensor circuitry must be increased by amplifying the very weak current between the electrodes, so that immersion in the low conductivity liquids may be sensed. This higher sensitivity, however, may result in other problems. In particular, sensors set to a very high sensitivity may detect latent moisture on the electrodes as immersion. In addition, high conductivity may cause associated control electronics to function in a manner that is not as intended. For example, the sensor operation may result in the UV light source continuing to operate after the light source is removed from the water due to the latent is moisture on the electrodes being sensed as continued immersion.

In addition to the problems associated with sensing low conductivity liquids, there are corrosion issues associated with conductivity based liquid sensors. When current flows between the sensor electrodes, electrolysis occurs and, over time, the electrode surfaces corrode. The corrosion may cause a change in the mechanical and electrical characteristics and this, in turn, may cause problems with sensor function. Over long periods, electrolysis may even destroy the sensor electrodes, and thus, cause system failure.

Another method of liquid sensing uses light rather than conductivity. This optical sensing approach takes advantage of the differences in refractive indexes of air and water. Normally the optical sensor consists of a light source such as a light-emitting diode (LED) device, a light-sensing component or photo sensor, such as a photodiode or a phototransistor, and a precise conical lens or a prism generally in the form of a cylindrical quartz rod, that is, a lens or prism manufactured to exhibit calculated characteristics. Typically, the light source and photo sensor are precisely positioned side by side under the conical lens, such that the lens allows the light from the light source to pass through when the lens is in water and causes the light emitted from the LED device to be reflected in calculated paths and directions toward the photo sensor when the lens is in air. The prisms operate in essentially the same manner when the light source and the photo sensor are precisely positioned relative to the prism. Sensors using a prism or conical lens tend to be relatively costly, and thus unprofitable, for use in lower cost products, e.g., the SteriPEN® UV Water Purifier from Hydro Photon.

In addition to being costly, the optical sensors incorporating the conical lenses and prisms may malfunction in environments in which ambient light is relatively bright. In such environments, the ambient light enters the conical lens and is also directed in calculated paths and directions toward at the photo sensor. Thus, such a sensor in a brightly lit water tank may not trigger as it should, i.e., as the water level changes, because the photo sensor cannot distinguish between the ambient light and the light produced by the light source in the light that is directed by the conical lens or prism to the photo sensor.

SUMMARY OF THE INVENTION

The inventive optical sensor consists of an LED semiconductor material and elements (herein after the LED components) surrounded by a transparent encapsulant that allows much of the light produced by the LED components to pass through while a certain small percentage of the light is internally reflected. The percentage of light internally reflected depends upon whether at least a front face of the encapsulant is immersed in liquid or in air. The optical liquid sensor also consists of a strategically placed photo sensor that detects the intensity of light that is internally reflected by at least the front face of the encapsulant surrounding the LED components. The photo sensor is able to detect the change in intensity of light being internally reflected by at least the front face of the encapsulant when the front face, for example, emerges from immersion in a liquid.

The LED components may be encapsulated separately from or in the same encapsulant as the strategically placed photo sensor. If the LED components and the photo sensor are encapsulated separately, the photo sensor is positioned to detect light that is internally reflected in the encapsulant and which then passes through a back side of the encapsulant. The amount of light that passes through the back side of the LED encapsulant varies depending on whether or not at least a front face of the encapsulant is immersed in a liquid as opposed to gaseous fluids, such as air. When the front face of the encapsulant is immersed in a liquid, such as water, the intensity of light passing through the back side of the encapsulant is measurably lower than that of the light that passes through the back side when the front face is immersed instead in air or some other gas.

Alternatively, if the LED components and the photo sensor are encapsulated together, the photo sensor can be positioned within the encapsulant in a number of locations provided that the photo sensor is able to detect the change in the intensity of the light that is internally reflected by the transparent encapsulant.

To improve operation of the optical liquid sensor in environments in which the optical liquid sensor is exposed to ambient light, the LED components may be pulsed on and off such that the photo sensor is able to detect the intensity of ambient light when the LED components are pulsed off. The optical liquid sensor is thus able to filter out the contribution of the ambient light in measurements made while the LED components are pulsed on.

BRIEF DESCRIPTION OF THE DRAWINGS

The invention description below refers to the accompanying drawings, of which.

DETAILED DESCRIPTION OF AN ILLUSTRATIVE EMBODIMENT

Contrary to the teachings of known optical sensors that employ precision lenses and prisms to direct light in calculated paths and directions toward a photo sensor, the inventive optical liquid sensor strategically places a photo sensor to receive light that is normally internally reflected by a transparent encapsulant surrounding LED components (i.e., LED semiconductor materials and elements). The intensity of the light that is internally reflected by the encapsulant and detected by the photo sensor varies depending on whether or not at least the front face of the encapsulant is immersed in a liquid. For example, when at least the front face of the encapsulant is immersed in a liquid, such as water, the intensity of internally reflected light is measurably less than the light reflected when the front face of the encapsulant is instead immersed in, e.g., air.

Figure 1:
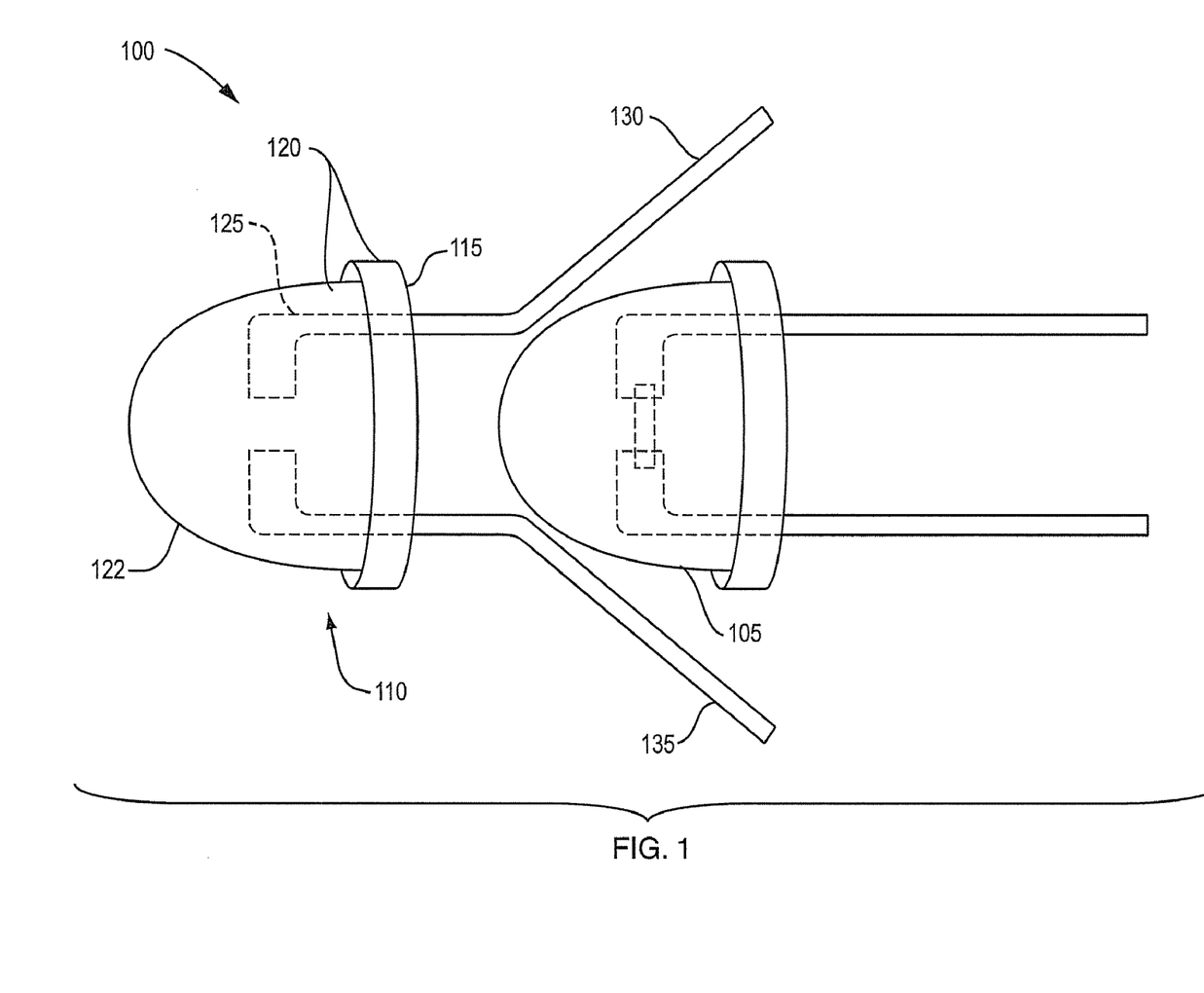
FIG. 1 is a schematic block diagram of an exemplary optical liquid sensor in accordance with an illustrative embodiment of the current invention.

FIG. 1 is a schematic block diagram of an exemplary optical liquid sensor 100 in accordance with an illustrative embodiment of the current invention. The sensor consists of an encapsulated LED 110 and a photo sensor 105 (e.g., a phototransistor) that are strategically positioned to sense light that is internally reflected by a front face 122 of the encapsulant 120. In the illustrated arrangement, the photo sensor 105 senses light that passes through a back side 115 of the encapsulant 120. Illustratively, the LED semiconductor materials and elements, referenced collectively as LED components 125, are contained in the encapsulant 120, which may be made from any number of transparent materials. In the exemplary embodiment 100, the photo sensor 105 is positioned between LED leads 130 and 135.

While the transparent encapsulant 120 is constructed to direct much of the light produced by the LED components 125 out of the front face 122 of the encapsulant 120, a small percentage of the light is necessarily internally reflected and exits through the back side 115 of the encapsulant 120. By positioning the photo sensor 105 behind the encapsulated LED 110, the photo sensor 105 is able to take advantage of the fact that most of the light emitted by the LED components 125 is projected through the front face 122 of the encapsulant 120 when at least the front face 122 of the encapsulant 120 is immersed in a liquid (e.g., water), and thus, little light is internally reflected and escapes through the back side 115 of the encapsulant 120. However, when at least the front face 122 of the encapsulant 120 is employed in a gaseous fluid (e.g., air), slightly more of the light is internally reflected and escapes through the back side 115 of the encapsulant 120, and the strategically placed photo sensor 105 can thus measure a difference in the intensity of the light passing through the back side 115 of the encapsulant 120. Although the above description has been described as utilizing an encapsulated LED and a photo sensor, it will be understood by those skilled in the art that other similar components may be used. Thus, although FIG. 1 depicts the photo sensor 105 as having a separate encapsulation, such separate encapsulation is not required as will be described further below.

Figure 2:
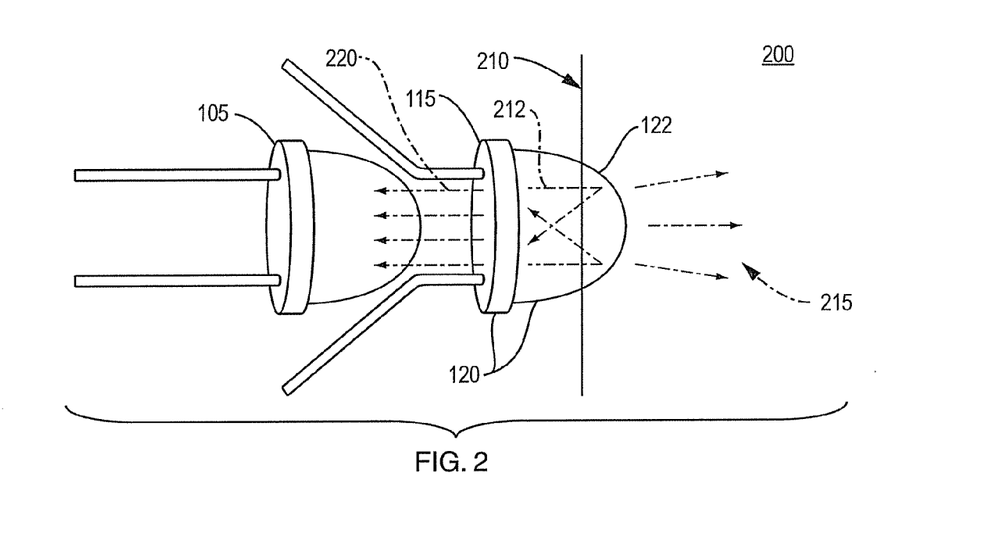
FIG. 2 is a schematic block diagram of an exemplary optical liquid sensor device operating in an air environment in accordance with an illustrative embodiment of the current invention.

The above described optical liquid sensor internally reflects more or less light back through the encapsulant 120 depending on which type of fluid in which at least the front face 122 of the encapsulant 120 is immerse. FIG. 2 is a schematic block diagram of an exemplary optical liquid sensor residing in a container wall 210 and operating in an air environment in accordance with an illustrative embodiment of the current invention. When the at least the front face 122 of the encapsulant 120 is in an air environment 200, a large percentage of the light 212 produced by the LED components passes out of the front face 122 of the encapsulant 120 as light 215, while a certain small percentage of the light 212 is internally reflected and escapes out of the back side 115 of the encapsulant 120 as reflected light 220. The photo sensor 105 is positioned to sense the light 220 that escapes through the back side of the encapsulated LED, and based on the intensity of the light 220, signals that the optical liquid sensor is operating in air rather than being immersed in a liquid (e.g., water).

Figure 3:
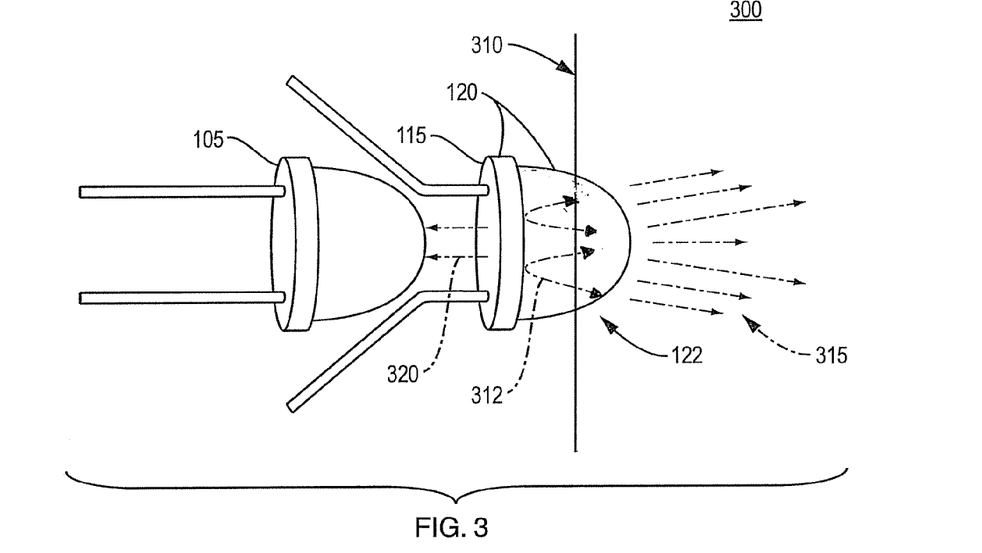
FIG. 3 is a schematic block diagram of an exemplary optical liquid sensor device operating in a liquid environment in accordance with an illustrative embodiment of the current invention.

However, when at least the front face 122 of the encapsulant 120 is immersed in a liquid, an even smaller percentage of the light produced by the LED components 125 is internally reflected 312 and passed through the back side 115. FIG. 3 is a schematic block diagram of an exemplary optical liquid sensor operating in a liquid environment 300 and residing in a container wall 310 in accordance with an illustrative embodiment of the current invention. As can been seen by the illustrative embodiment, when at least the front face 122 of the encapsulant 120 is immersed in the liquid environment 300 (e.g., water), the light 315 produced by the LED components 125 projects more fully out the front face 122 of the encapsulant 120, and less light 320 passes through the back side 115 of the encapsulant 120. Thus, the photo sensor 105 senses very little light. Accordingly, the measurements of the photo sensor 105 can be used to determine whether at least the front face 122 residing in the container wall 310 is immersed in the liquid environment 300.

Like conventional optical sensors that have a precision lens and prisms, the exemplary photo sensor 105 may also inadvertently sense ambient light. However, by strategically arranging the photo sensor 105 behind the body of the encapsulated LED 110, the amount of ambient light reaching the photo sensor is reduced, such that the device may operate effectively in ambient light conditions in which the conventional optical sensors are ineffective.

Figure 4:
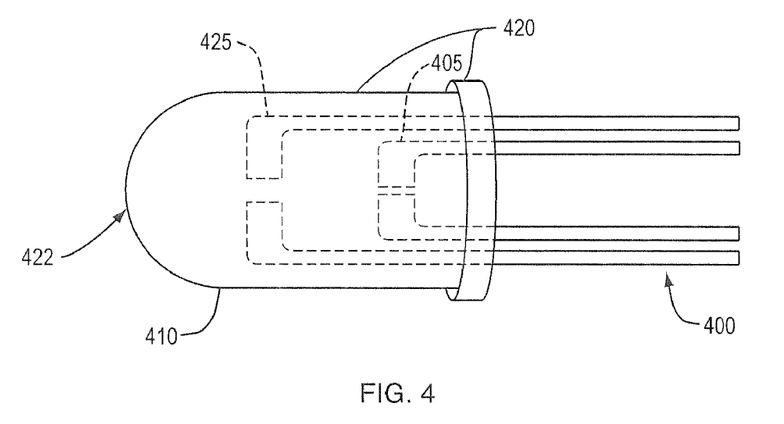
FIG. 4 is a schematic block diagram of an exemplary optical liquid sensor device in accordance with an illustrative embodiment of the current invention.

As discussed above, the LED components 125 and the photo sensor 105 may instead be encapsulated together. Referring to FIG. 4, the optical liquid sensor 400 consists of LED components 425 and a photo sensor 405 (e.g., a phototransistor) that are strategically positioned within an encapsulant 420. The encapsulant 420 can be made from any number of transparent or translucent materials that allow light to be emitted through its surface 410. For exemplary purposes, however, the encapsulant described herein will be described as transparent. In the exemplary embodiment 400, the photo sensor 405 is positioned directly behind the LED components 425. However, although the above description has been described as utilizing LED components and a photo sensor, it will be understood by those skilled in the art that other similar components may be used.

Figure 5A:
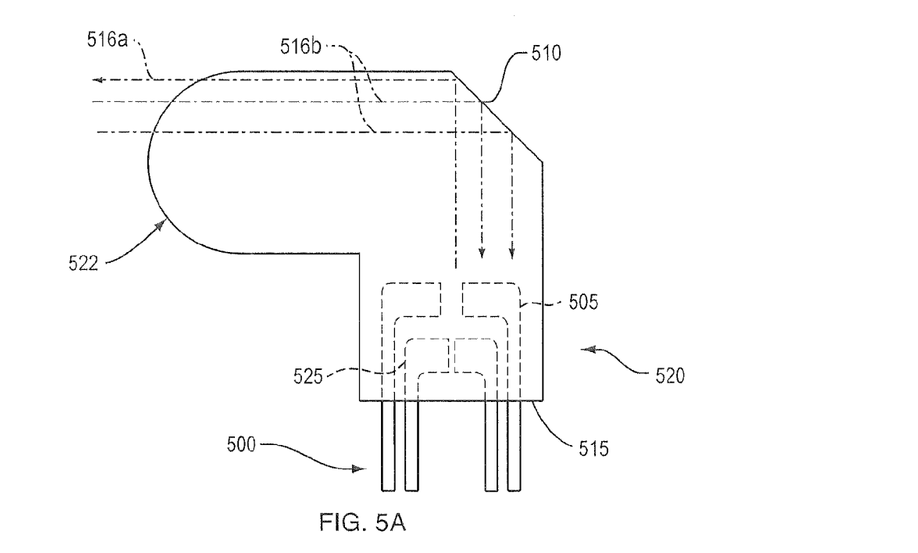
FIGS. 5A and 5B are schematic block diagrams of an exemplary optical liquid sensor device in accordance with an illustrative embodiment of the current invention.
Figure 5B:
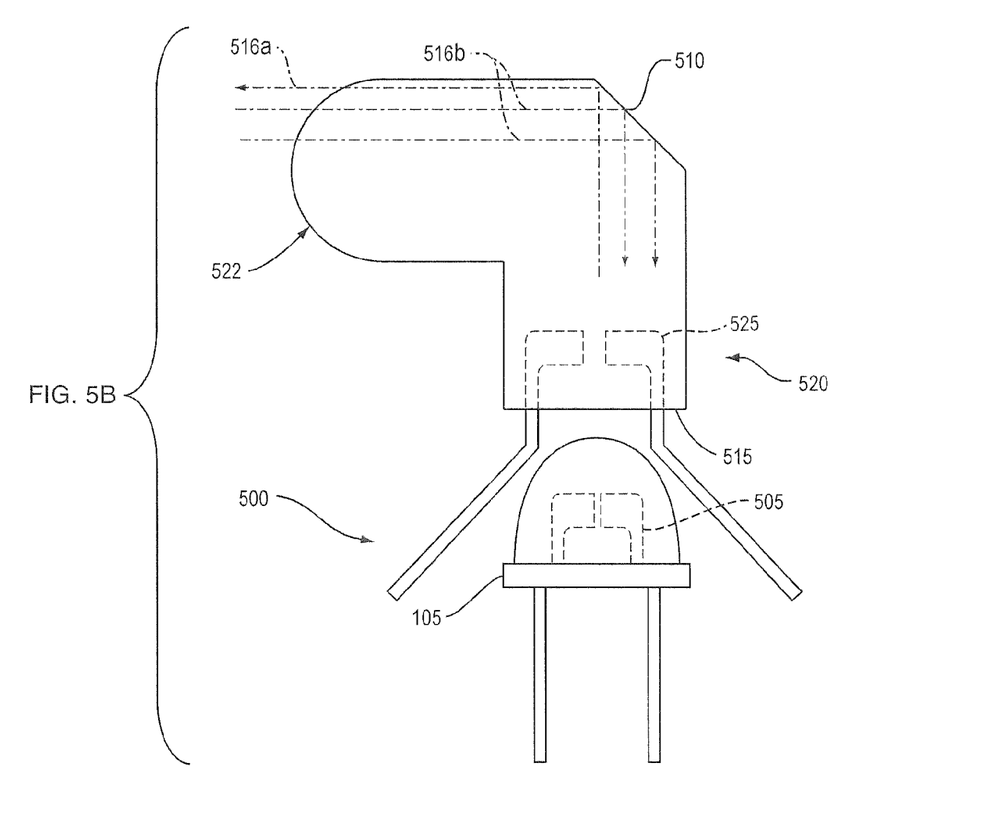

FIGS. 5A and 5B are schematic block diagrams of an alternative arrangement that includes an encapsulant 520 that is constructed in the shape of a cylinder having a 90-degree elbow disposed between a front face 522 of the cylinder and a back side 515 of the cylinder. A is reflective surface 510 of the encapsulant 520 is orientated to direct light 516a that is produced by one or more LED components 525 out of the front face 522 of the encapsulant. Light 516b that is internally reflected by the front face 522 hits the 90 degree reflective surface 510 and is necessarily reflected back toward photo sensor 505. The photo sensor 505 is thus able to sense the intensity of the internally reflected light.

Figure 6:
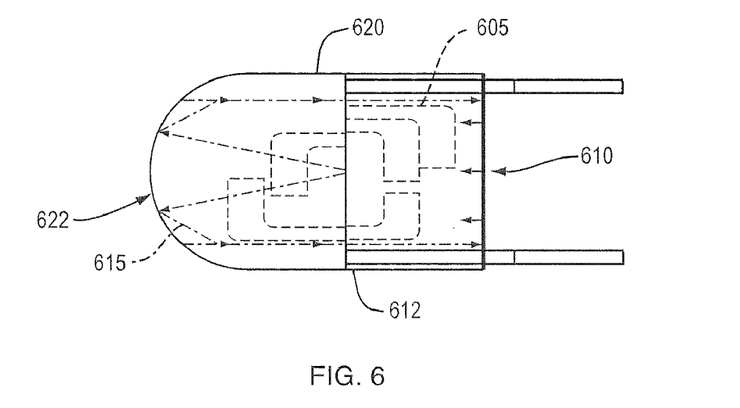
FIG. 6 is a schematic block diagram of an exemplary optical liquid sensor device in accordance with an illustrative embodiment of the current invention.

FIG. 6 is a schematic block diagram of an exemplary optical liquid sensor device in accordance with an illustrative embodiment of the current invention. In optical liquid sensor 600, a photo sensor 605 is attached directly to the back side 612 of the encapsulated LED 620. The LED components 625 and those of the photo sensor 605 are positioned in opposing directions, e.g., the photo sensor 605 is positioned facing away from the LED components 625. The light 615 that is internally reflected and passes through the back side 615 of the encapsulated LED 620 is reflected back towards the photo sensor components 605 by a reflective surface 610 of the enclosure that surrounds the photo sensor 605.

Figure 7:
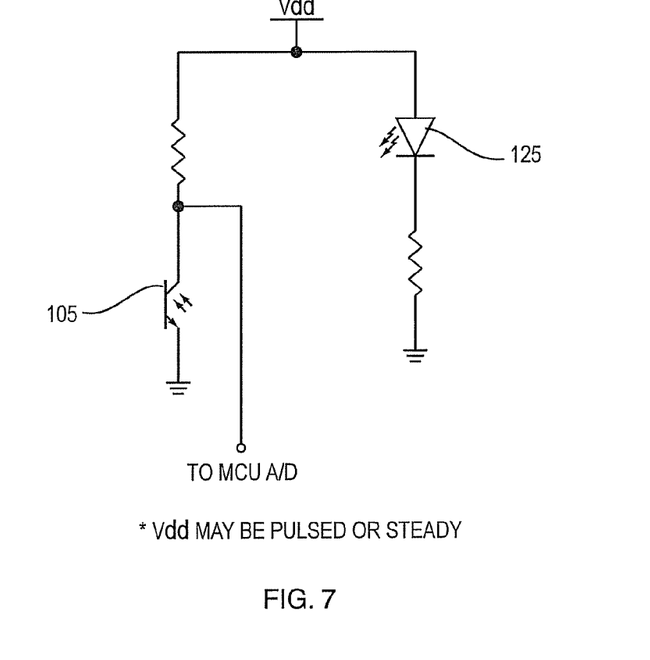
FIG. 7 is a schematic block diagram of an exemplary resistive bridge circuit employing the exemplary optical liquid sensor.
Figure 8:
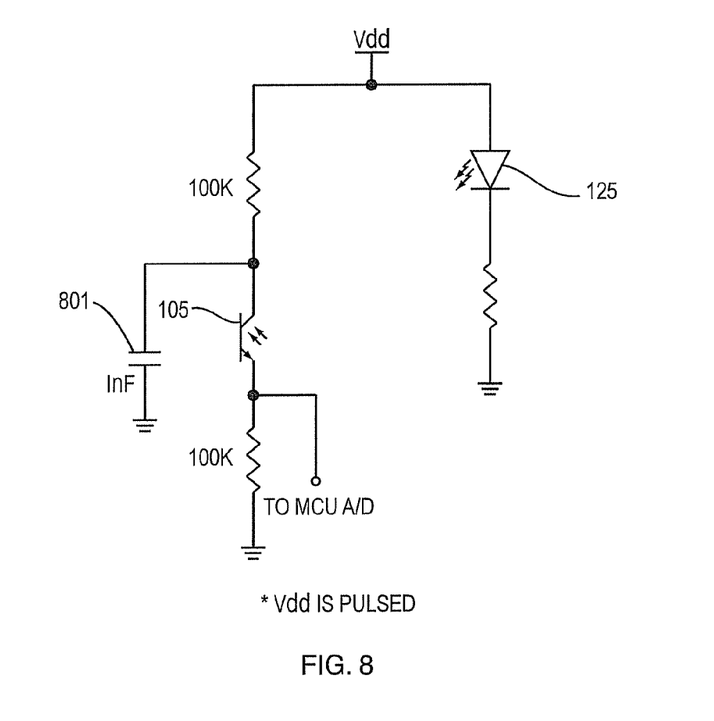
FIG. 8 is a schematic block diagram of an exemplary resistive bridge circuit for an optical liquid sensor device having an ambient light filtering mechanism as in accordance with an illustrative embodiment of the current invention.

Additionally the current invention may further be configured to reduce the adverse effects of ambient light that may reach the photo sensor. Control mechanisms may be implemented in the optical liquid sensor, to allow the light emitted by the LED components to be pulsed at a known frequency. In response to the pulsed light, the photo sensor produces an output signal that is similarly pulsed, and a signal value attributable to the ambient light, can then be readily determined and/or filtered out. The pulsed signal produced by the photo sensor may be handled in a number of ways to separate the response to the LED light from the response to the ambient light. The response to the ambient light is essentially a DC component of the total response of the photo sensor. Accordingly, known mechanisms to analyze and/or filter out DC components can be utilized to compensate for the response to the ambient light in the total response of the photo sensor. For example, high pass filtering, rectification, and so forth may be used. FIG. 7 depicts the photo sensor 105 and encapsulated LED components 125, as a component of a resistive bridge. In FIG. 8, the output of the photo sensor 105 is filtered by filter 801, to aide in the operation of the optical liquid sensor in ambient light.

Optionally, the optical liquid sensors illustratively described in FIGS. 1-6 may also filter ambient light using one or more optical filtering techniques. For example, the encapsulant 120 maybe made of a material which allows only light having a specific wavelength, e.g. the wavelength of the light emitted from the LED components, to pass through the encapsulant. Thus, the encapsulant embodying an optical filtration system would prevent ambient light from passing through to the photo sensor.

The optical liquid sensor may also be configured to differentiate one liquid from another liquid by calculating the differences in the refractive indices based on the differences in intensities of light measured when the sensor is immersed in the different liquids.

An epoxy or other material having desired optical characteristics, e.g., refractive indices that are the same as or similar to that of the encapsulant, may advantageously be applied between the encapsulant 120 and the photo sensor 105 to hold the photo sensor in position and/or help transfer light. Alternatively, the epoxy or other material may be used in the embodiment in which the LED components 125 and the photo sensor 105 are encapsulated in a single enclosure, to optically couple the two devices.

Figure 9:
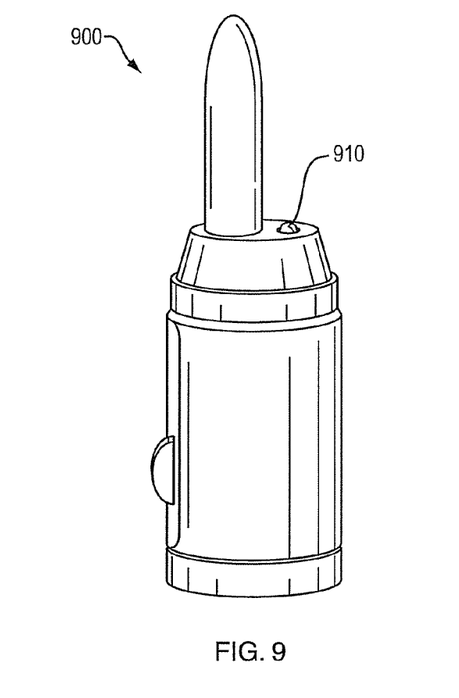
FIGS. 9 and 10 are a schematic diagrams illustrating use of the optical liquid sensor of FIGS. 1-6 with of a hand held UV water purifier in accordance with an illustrative embodiment of the current invention.

Advantageously, the current invention may be used in a number of applications/devices which require water/liquid detection. For example, FIG. 9 is a schematic diagram illustrating use of the optical liquid sensor 910 of FIGS. 1-6 with a hand held UV water purifier 900 (e.g., the SteriPEN® UV Water Purifier from Hydro Photon) in accordance with an illustrative embodiment of the current invention.

Additionally, the LED components in the current invention may operate in various modes that allow the LED components to serve a multi-functional purpose. Such various modes may be entered by pushing a button (not shown) in a specific sequence or by implementing other switching mechanism(s). These various modes may include, for example, a flashlight mode, an emergency light beacon (e.g., to be used on a lifejacket), or any other various devices where a light source and an optical liquid sensor in combination may be beneficial. By utilizing the same LED components 125 implemented in the optical liquid sensor 910 as an optional light source, the consumer is provided with a simpler less expensive device that does not require multiple sets of LED components to perform the different functions. Additionally a liquid sensing mode may be automatically selected by the UV water purifier to determine if the UV light source should be turned on, in order to prevent a user from inadvertently leaving the UV light source on after the UV light source is removed from water.

Figure 10:
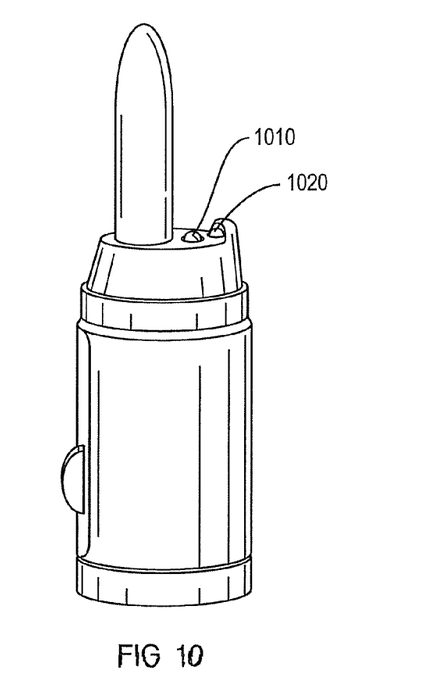

In another embodiment of the current invention, the sensor may also be used to detect high levels of turbidity in drinking water. FIG. 10 is a schematic diagram illustrating use of the optical liquid sensor of FIGS. 1-6 referred to by reference numeral 1010 with an additional photo sensor 1020. Additional photo sensor 1020 is positioned relative to the optical liquid sensor to sense light reflected by particulates in the water. Thus, the greater the intensity of the light at the photo sensor 1020, the greater the turbidity of the water. To combat the effects of ambient light, the optical liquid sensor may be operated by pulsing the associated LED (not shown). As with the above-described optical liquid sensors 100-600, the pulsed signal from the turbidity photo sensor may also be analyzed and/or manipulated, e.g., filtered to compensate for the signal components associated with the ambient light.

The optical sensors described above with reference to 1-6 have a significant advantage over known prior optical sensors because they eliminate the need for conical precision lenses and prisms along with their associated structural mechanisms. As stated above, this reduces the costs of the device significantly, as conical precision lenses and prisms are relatively expensive. The strategic placement of the photo sensor behind the encapsulated LED in the current device minimizes the adverse affects of ambient light on operations of the photo sensor, essentially because much of the ambient light is blocked and thus, does not interfere with the photo sensor measuring capability.

Additionally, one or more LED components of different colors or color combinations may be used, depending on the type of liquid being detected, e.g., red may be used for water detection. In addition to color, the above described LED's may also be configured to emit different types of light, such as infrared light, or ultraviolet light, so as to maximize the performance of the above described optical liquid sensor is particular liquids.

As will be appreciated by those skilled in the art, the various compositions of the optical liquid sensor described above with reference to FIGS. 1-10 are exemplary only. Additional variations of encapsulated LED components, photo sensors, and applications may be used without departing from the spirit and scope of the current invention. For instance, both the LED components and the photo sensor may be implemented on the same printed circuit board assembly (PCBA), thus providing more efficient circuitry. Furthermore, it is expressly contemplated that the inventive optical liquid sensor may be utilized in various environments, such as, various gases, liquids and/or a combination thereof which may vary from those described herein. As such, the descriptions of specific materials and/or properties should be taken as exemplary only. Also, the LED components and the photo sensor may be in different relative positions, for example, side by side, at relative angles and so forth.

What is claimed is:

1. An optical liquid sensor comprising:
   light emitting diode (LED) components disposed in an encapsulant having a front face and a back side, the encapsulant is a transparent material allowing light internally reflected by the encapsulant to escape out the back side; and
   a photo sensor positioned to receive internally reflected light that has passed through the back side of the encapsulant, the photo sensor configured to:
   measure the intensity of the light that escapes through the back side of the encapsulant, and
   determine whether at least the front face of the encapsulant is immersed in a liquid or a gas wherein a measurement below a certain intensity of light indicates that at least the front face of the encapsulant is immersed in a liquid.

2. The optical liquid sensor of claim 1, wherein the encapsulant is constructed to direct more of the light emitted by the LED components out of the front face of the encapsulant than the back side of the encapsulant.

3. The optical liquid sensor of claim 1, wherein the photo sensor is positioned between two leads operably connected to the LED components, the photo sensor being positioned between respective ends of the leads that extend outwardly from the encapsulant.

4. The optical liquid sensor of claim 1 wherein a control mechanism is configured to pulse the LED components.

5. The optical liquid sensor of claim 4, wherein the photo sensor is configured to respond to the pulsing to filter out a response to ambient light.

6. The optical sensor of claim 5, wherein the photo sensor is further configured to determine a type of liquid in which the optical liquid sensor is immersed by utilizing a refractive index calculation.

7. The optical liquid sensor of claim 1, wherein the optical liquid sensor is incorporated into an ultraviolet (UV) water purifier having a UV light source wherein the optical liquid sensor prevents the UV light source from turning on if the UV light source is not immersed in a liquid.

8. The optical liquid sensor of claim 7, wherein an additional photo sensor is used in combination with the optical liquid sensor to detect high levels of turbidity in the liquid.

9. The optical liquid sensor of claim 7, wherein the LED components operate in various modes, the various modes selected from a group consisting of: a flashlight mode, a pulsing emergency light mode, and a liquid sensing mode.

10. The optical liquid sensor of claim 9, wherein the liquid sensing mode is automatically selected by the UV water purifier to determine if the UV light source should be turned on.

11. The optical liquid sensor of claim 1, wherein the encapsulant is a cylinder having a bend disposed between the front face of the cylinder and the back side of the cylinder, the encapsulant further comprising a reflective surface at the bend that directs light both toward and away from the photo sensor.

12. The optical liquid sensor of claim 1, wherein the photo sensor is configured to determine a type of liquid in which the optical liquid sensor is immersed by utilizing a refractive index calculation.

13. The optical liquid sensor of claim 1, wherein the LED components emit an infrared light.

14. The optical liquid sensor of claim 1, wherein the color of the light emitted by the LED components is selected by the user at the time of operation.

15. The optical liquid sensor of claim 1, wherein ambient light is filtered out from LED light by an optical filter.

16. A method comprising:
   positioning a photo sensor relative to one or more light emitting diode (LED) components to receive light internally reflected back from a front face of an encapsulant surrounding the LED, the photo sensor being positioned either
   within the encapsulant and in front of or beside the LED components, or
   outside of and behind the encapsulant;
   measuring an intensity of light detected within the encapsulant, the intensity of the light changing based on whether at least the front face of the encapsulant is immersed in a liquid or a gaseous fluid; and
   determining whether the encapsulant is immersed in a liquid or a gas wherein light below a certain intensity indicates the encapsulated LED is immersed in a liquid.

17. The method claim 16, the method comprising filtering out pulsing of the LED components to filter out a response to ambient light based on the pulsing of the LED components.

18. The method of claim 16, using an additional photo sensor to detect high levels of turbidity in the liquid.

19. The method of claim 16, wherein ambient light is filtered out from LED light by an optical filter.

* * * * *

UNITED STATES PATENT AND TRADEMARK OFFICE
CERTIFICATE OF CORRECTION

| | |
|---|---|
| PATENT NO. | : 8,362,432 B2 |
| APPLICATION NO. | : 12/650746 |
| DATED | : January 29, 2013 |
| INVENTOR(S) | : Miles Maiden |

It is certified that error appears in the above-identified patent and that said Letters Patent is hereby corrected as shown below:

In the Specifications:

Col. 1, line 22, after "against" delete "is";
Col. 1, line 59, after "latent" delete "is";
Col. 5, line 40, after "A" delete "is".

Signed and Sealed this
Seventh Day of May, 2013

Teresa Stanek Rea
*Acting Director of the United States Patent and Trademark Office*